VARIABLE FREQUENCY OSCILLATOR UTILIZING CURRENT CONTROLS

Filed Aug. 20, 1964

INVENTOR
JOHN LEWIS EDWIN BALDWIN
BY Hane and Nydick
ATTORNEYS

United States Patent Office 3,292,106

Patented Dec. 13, 1966

3,292,106

VARIABLE FREQUENCY OSCILLATOR UTILIZING CURRENT CONTROLS

John Lewis Edwin Baldwin, Croydon, England, assignor to Rank-Bush Murphy Limited, London, England, a British limited company Filed Aug. 20, 1964, Ser. No. 392,674

Claims priority, application Great Britain, Aug. 23, 1963, 33,422/63

5 Claims. (Cl. 331—117)

Figure 1:
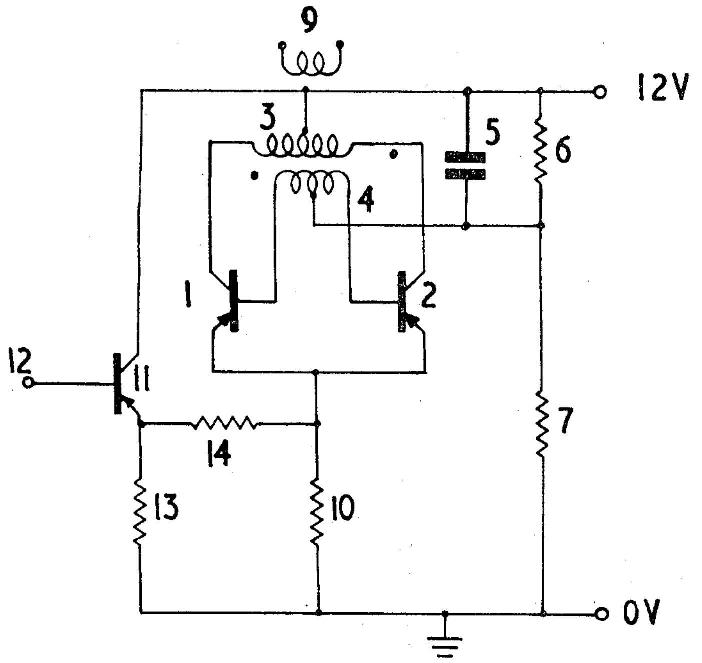

This invention relates to improvements in variable frequency oscillators and in particular to oscillators of which the frequency may be varied by an applied voltage.

It is an object of the present invention to provide a variable-frequency oscillator having advantages in simplicity of construction as compared with known devices of this kind.

It is a further object of the present invention to provide a variable-frequency oscillator useful in developing a frequency-modulated signal.

Yet another object of the invention is to provide a frequency-modulable oscillator capable of responding to video frequency modulating signals.

It is a specific object of the invention to provide a transistor oscillator capable of developing a carrier frequency modulated in frequency by video-frequency signals.

A variable-frequency oscillator according to the invention may comprise the combination of two transistors, each having a base electrode, an emitter electrode and a collector electrode; a direct connexion commoning said emitter electrodes; a source of direct current having first and second poles; a connexion including total emitter-current restricting means from said commoned emitter electrodes to said first terminal of said source; a transformer having primary and secondary windings; connexions in predetermined polarity between said collector electrodes and respective ends of said primary winding; a centre-tap on said primary winding; a connextion from said centre-tap to said second terminal of said source; connexions opposite in polarity to said predetermined polarity between said base electrodes and respective ends of said secondary winding; a centre-tap on said secondary winding; a direct-voltage source having terminals at different potentials; connexions from said terminals of said source to said centre-taps on said primary and secondary windings; and means operable to vary the relation between said total emitter current and said direct voltage and thereby to alter the operating frequency of said oscillator.

In a preferred embodiment of the invention the current determining device comprises an emitter follower transistor working into a resistance network which includes the resistance connected between the emitters of first said transistors and the supply line. The current passed by the emitter-follower transistor is then varied by changing its base potential to alter as required the current available to the oscillator transistors. Alternatively the current made available to the transistors may be fixed and the value of said direct voltage may be altered to vary the oscillator frequency. Where it is desired that the oscillator frequency shall be modulated by an applied signal, this modulating signal may be applied to the base of a transistor connected as described in the common emitter lead of the oscillator transistors, or to the base of an emitter-follower transistor forming a low-impedance source for the direct voltage applied between the centre-taps of the two transformer windings.

Figure 2:
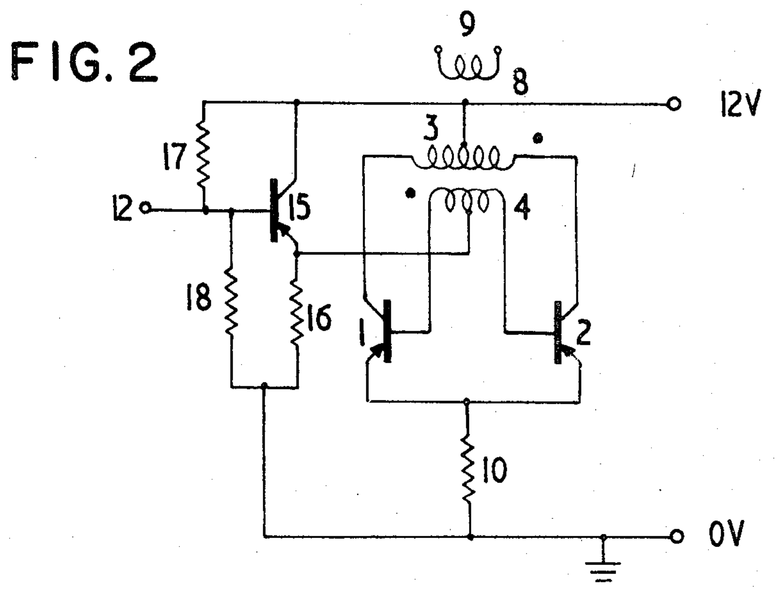

Those features of the invention which are believed to be novel are set forth with particularity in the appended claims; the invention itself, together with further objects and advantages thereof may best be understood by reference to the following description, taken in conjunction with the accompanying drawings, in the two figures of which like reference numerals are used to denote like elements and in which:

FIGURE 1 illustrates an embodiment of a variable-frequency oscillator in accordance with one aspect of the present invention, and FIGURE 2 illustrates an embodiment of a variable-frequency oscillator in accordance with another aspect of the present invention.

In the circuit arrangement depicted in FIGURE 1 a pair of similar transistors 1, 2 have their collectors connected to opposite ends of a centre-tapped transformer winding 3, the centre tap of which is taken directly to a direct current supply, which may conveniently have the voltage of 12 v. shown. The bases of transistors 1, 2 are similarly connected to the opposite ends of a further centre-tapped winding 4 of the transformer, the centre tap of which is bypassed to the supply line by way of a capacitor 5 having a negligible reactance at signal frequencies and is supplied with an appropriate direct potential, conveniently −10 v., from a voltage divider comprising a resistor 6 connected in series with a further resistor 7 across the supply. The oscillator output is taken from a coupling winding 8 and fed to terminal 9.

The emitters of transistors 1, 2 are connected together and are returned to the earthed positive terminal of the direct current supply by way of a resistor 10 forming part of a network including transistor 11 which as described below determines the current flow in the emitter lead. In the present embodiment of the invention the current flow is modulated in accordance with an applied signal by means of a third transistor 11, to the base of which the modulating signal is applied by way of an input terminal 12. Transistor 11 has its collector connected directly to the negative line and has its emitter returned to the positive line by way of a resistor 13 and coupled to the emitters of transistors 1, 2 by way of a further resistor 14. It will be apparent that varying the base potential of transistor 11 will alter the current passing through resistor 14 and hence the current which is available to the oscillator transistors 1 and 2.

The basis of operation of the oscillator proper is as follows: Suppose that transistor 1 has just become conductive and transistor 2 has been cut off. At this time transistor 1 is bottomed and its base current is that portion of the total current passed by the current-determining device which is not claimed by its collector. A constant voltage now appears across that portion of the primary winding 3 which is in series with the collector of transistor 1, so that the current passing through this winding portion can only increase linearly with time, to a first approximation. Since the total current available is controlled by the current determining device the base current of transistor 1 is reduced as the collector current increases, until a condition is reached in which the collector current attains the value of beta times the base current, when the transistor is no longer bottomed and the collector current can no longer increase as it is now controlled by the constant base current. The current through winding 3 therefore ceases to change and the voltage across it must fall to zero. A sudden change of voltage will therefore arise at the collector of the transistor. The resultant changes of voltage applied by way of winding 4 of the transformer to the bases of transistors 1 and 2 initiates the normal regenerative trigger action of the circuit which causes the former to be cut off while the latter is turned on. A similar sequence of operations in which transistor 2 is conductive then takes place.

It will be seen that the repetition rate of the oscillator is dependent upon the relation between the rate of rise of collector current and the total current available to the transistor, for the larger is this total current the longer will it be before the collector current, rising at a constant rate determined by the values of the inductance of the transformer winding and the base voltage applied to the transistor (since this determines the collector voltage and hence the potential applied across the transformer winding), becomes equal to beta times the base current which is the total current less the collector current.

In the arrangement shown in FIGURE 2 the relation between the rate of rise of the collector current and the total current available is modulated by varying the rate of rise. This is done by varying the base bias potential applied to the centre tap of transformer winding 4. To this end the modulating signal is applied by way of an input terminal 12 to the base of modulating transistor 15, connected as an emitter-follower with an emitter resistor 16. The centre-tap of winding 4 is connected directly to the emitter of transistor 15, which provides a low-impedance variable voltage source determining the base bias potentials of transistors 1 and 2 in accordance with the instantaneous value of the applied modulating signal. Resistors 17 and 18, connected from the base of transistor 15 to the negative and positive supply lines respectively, determines a suitable bias potential for the base of transistor 15.

Suitable component values for the circuit arrangement described in relation to FIGURE 1 are—

Transistors: 1,2, MAD501 (Philco); 3, AFZ11 (Mullard).

Resistors: 6, 22 Ω; 7, 100 Ω; 10, 1.8 kΩ; 13, 3.3 kΩ; 14, 2.2 kΩ.

Capacitor: 5, 0.1 μf.

Windings 3, 4, 8: Close-coupled, winding 3 bifilar; turns ratios 4:1:1.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. A variable-frequency oscillator comprising, in combination: two like transistors each having a base electrode, an emitter electrode and a collector electrode; a direct connexion commoning said emitter electrodes; a source of direct current having first and second poles; a connexion including total emitter-current restricting means from said commoned emitter electrodes to said first terminal of said source; a transformer having primary and secondary windings; connexions in predetermined polarity between said collector electrodes and respective ends of said primary winding; a centre-tap on said primary winding; a connexion from said centre-tap to said second terminal of said source; connexions opposite in polarity to said predetermined polarity between said base electrodes and respective ends of said secondary winding; a centre-tap on said secondary winding; a direct-voltage source having terminals at different potentials; connexions from said terminals of said source to said centre-taps on said primary and secondary windings; and means operable to vary the relation between said total emitter current and said direct voltage and thereby to alter the operating frequency of said oscillator.

2. A variable-frequency oscillator according to claim 1 in which said current restricting means is electrically controllable to vary said relation.

3. A variable-frequency oscillator according to claim 1 in which said direct voltage is electrically variable to vary said relation.

4. A variable-frequency oscillator according to claim 1 in which said current restricting means comprises a first resistor connecting said commoned emitter electrodes to said first terminal of said current source; a further transistor having a base electrode, an emitter electrode and a collector electrode; a direct connexion from said collector electrode to said second pole of said current source; a second resistor connecting said emitter electrode of said further transistor to first pole of said current source; a third resistor connecting said emitter electrode of said further transistor to said commoned emitter electrodes of first said transistor; a source of modulating signals; and circuit means applying said modulating signals from said source between said base and emitter electrodes of said further transistor.

5. A variable-frequency oscillator according to claim 1 in which said direct voltage source is constituted by the combination of: a further transistor having a base electrode, an emitter electrode and a collector electrode; a direct connexion from said collector electrode of said further transistor to said second pole of said current source; a first resistor connecting said emitter electrode of said further transistor to said first pole of said current source; third and fourth resistors respectively connecting said base electrode of said further transistor to said first and second poles of said current source; a source of modulating signals; circuit means applying said signals to said base electrode of said further transistor; and a connexion from said emitter electrode of said further transistor to said centre-tap on said secondary winding.

No references cited.

ROY LAKE, *Primary Examiner.*

J. KOMINSKI, *Assistant Examiner.*